Figure 1:
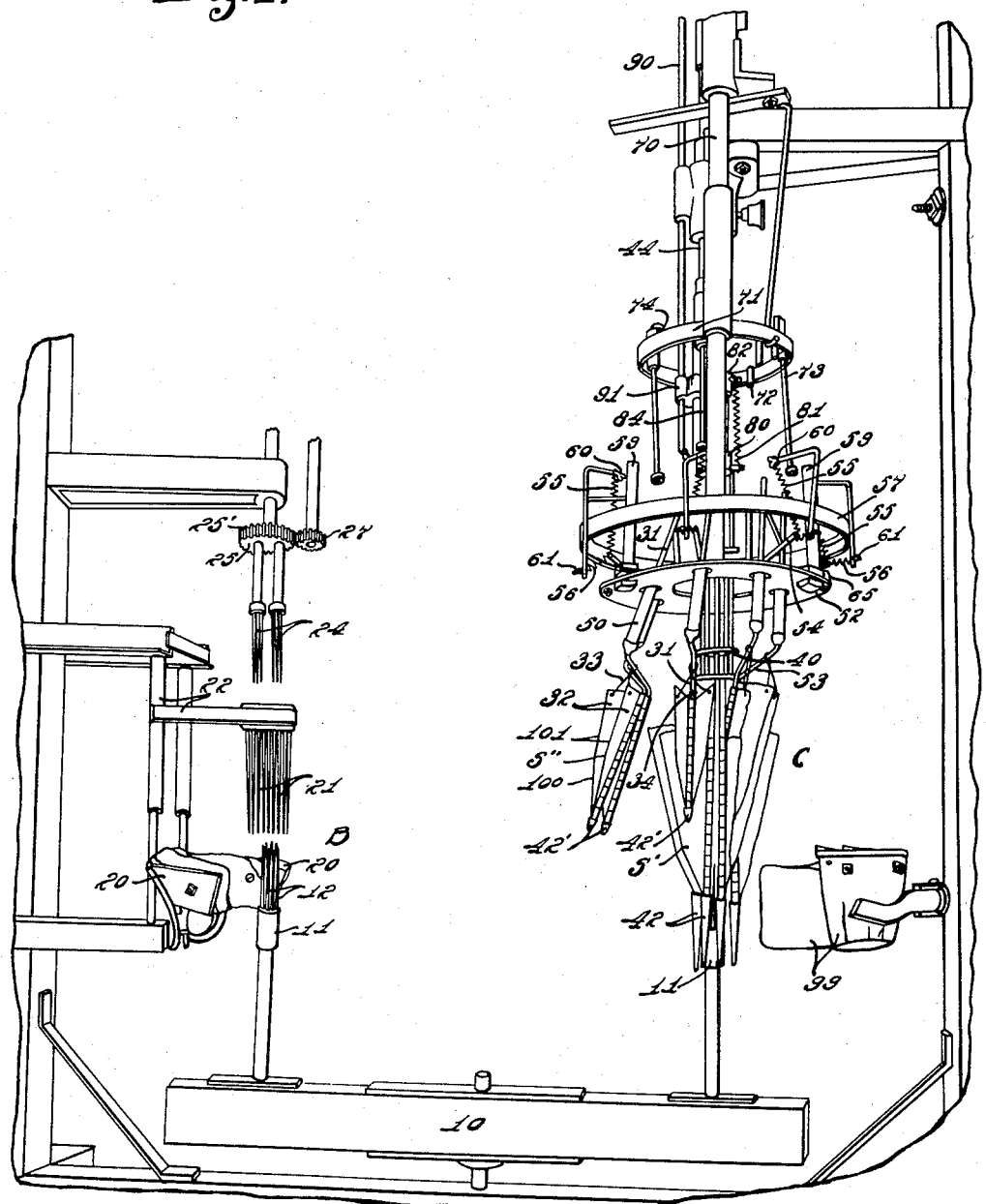

Sept. 6, 1938.   R. POLK, JR   2,129,101
APPARATUS FOR SEGMENTING INTEGUMENT FREE FRUIT SEGMENTS
Filed Nov. 29, 1937   5 Sheets-Sheet 1

INVENTOR.
Ralph Polk Jr.,
BY
Hood & Hahn.
ATTORNEYS.

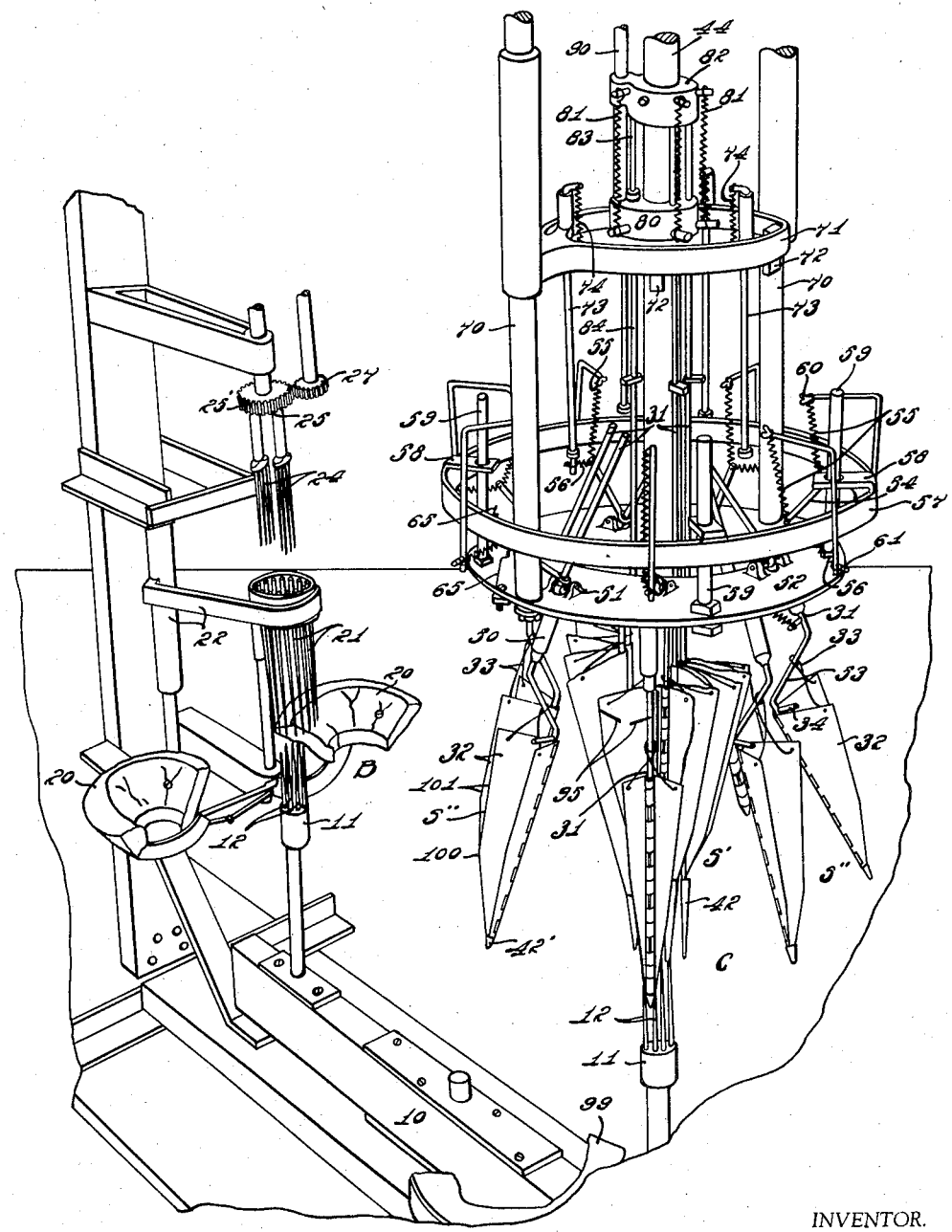

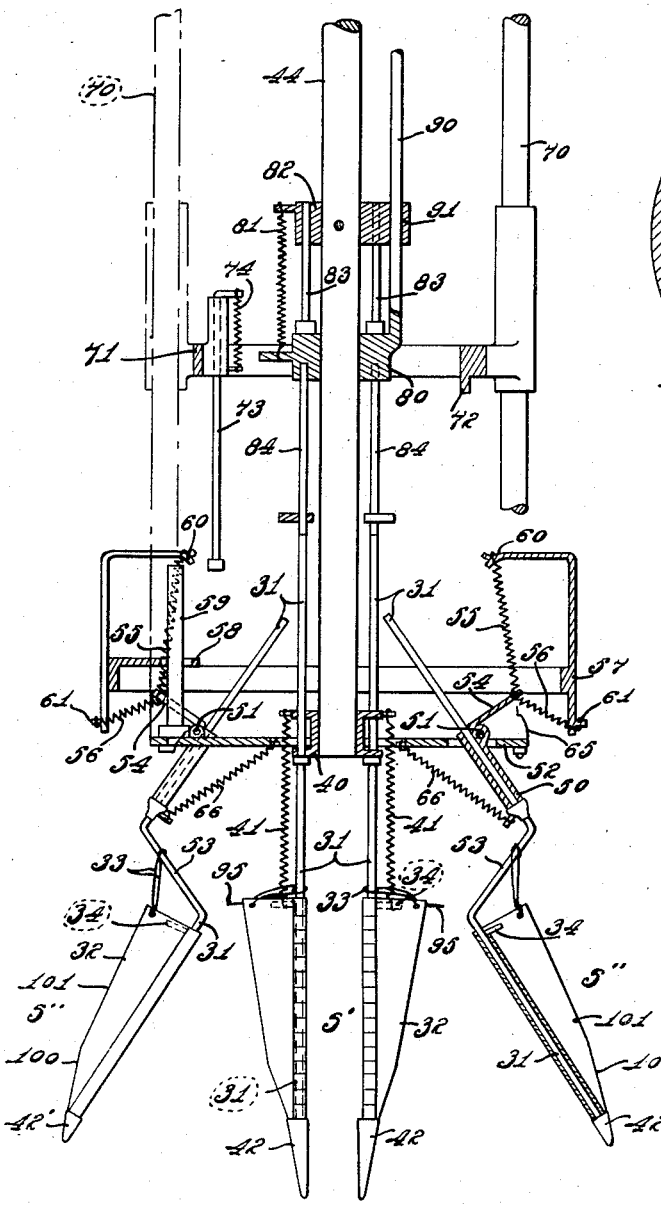
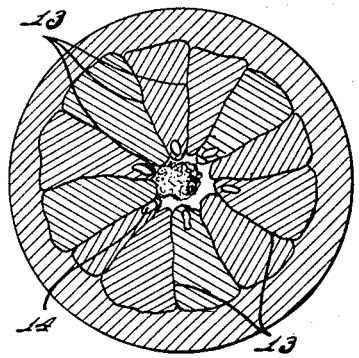

Sept. 6, 1938.  R. POLK, JR  2,129,101
APPARATUS FOR SEGMENTING INTEGUMENT FREE FRUIT SEGMENTS
Filed Nov. 29, 1937  5 Sheets-Sheet 4
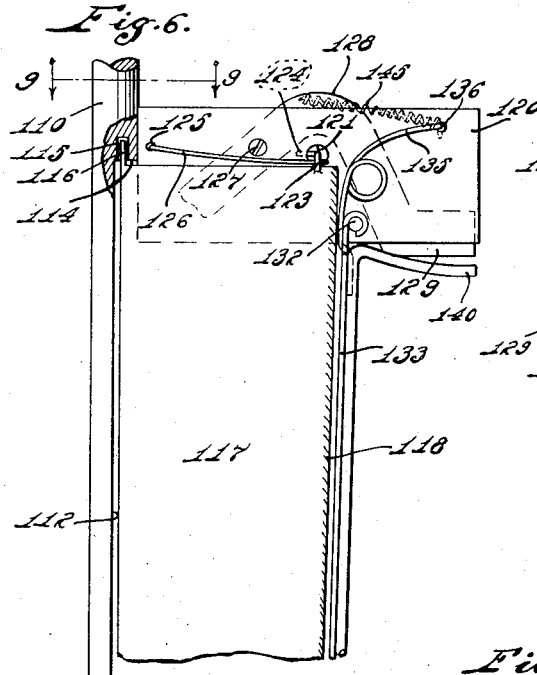
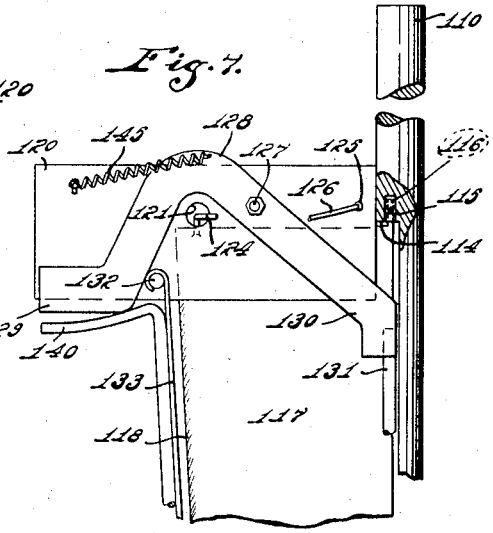
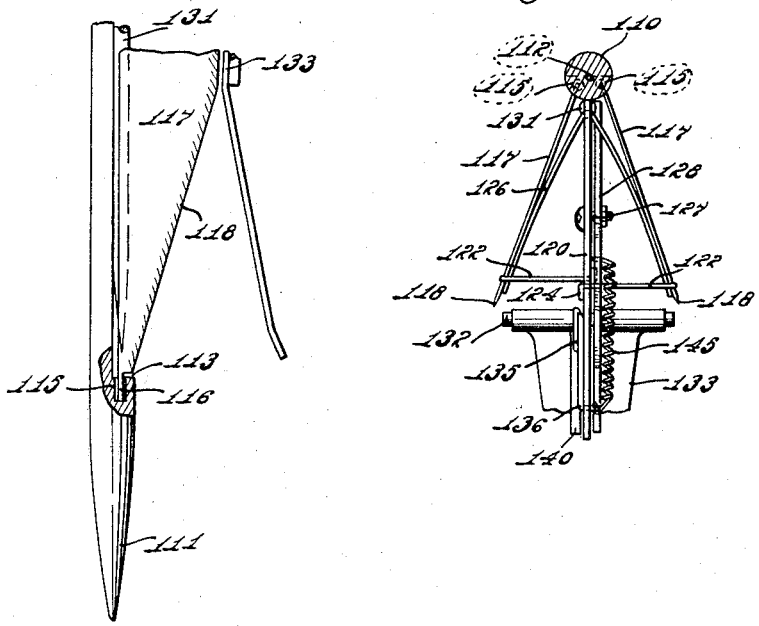
INVENTOR.
Ralph Polk Jr.,
BY
Hood & Hahn.
ATTORNEYS.

Sept. 6, 1938.   R. POLK, JR   2,129,101
APPARATUS FOR SEGMENTING INTEGUMENT FREE FRUIT SEGMENTS
Filed Nov. 29, 1937   5 Sheets-Sheet 5
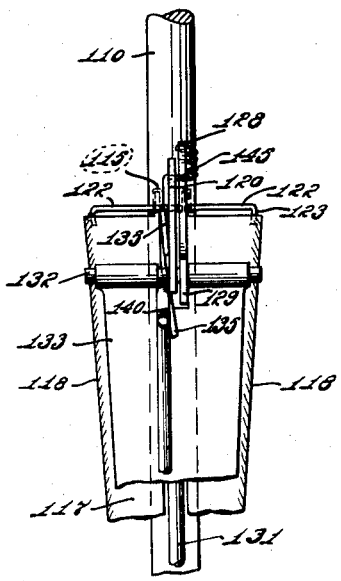
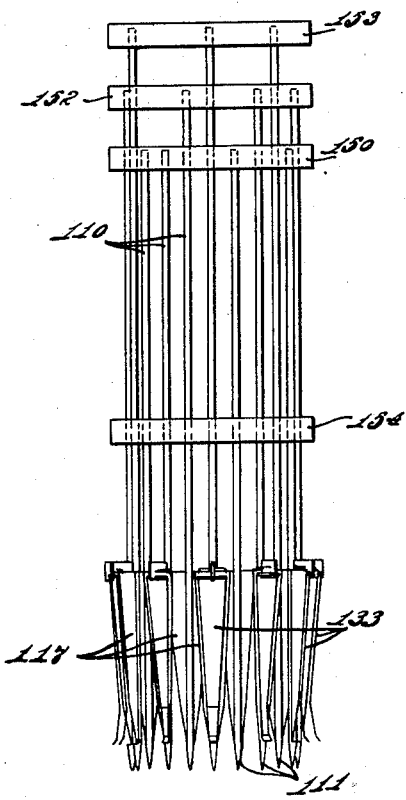
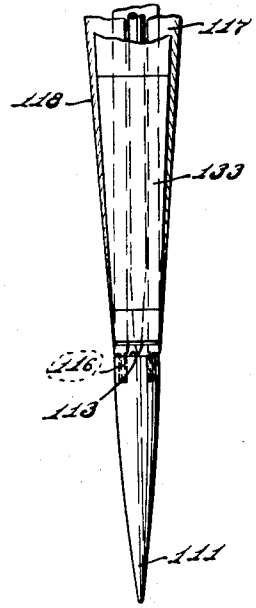
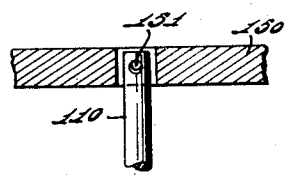
INVENTOR.
Ralph Polk Jr.,
BY
Hood & Hahn.
ATTORNEYS.

Patented Sept. 6, 1938

2,129,101

UNITED STATES PATENT OFFICE 2,129,101

APPARATUS FOR SEGMENTING INTEGUMENT FREE FRUIT SEGMENTS

Ralph Polk, Jr., Haines City, Fla.

Application November 29, 1937, Serial No. 177,135

19 Claims. (Cl. 146—3)

This application is a continuation in part of my pending application Serial No. 34,346, filed August 2, 1935.

Citrus fruits comprise edible centers composed of groups of nature-formed definitely defined readily separable segments, the acceptable edible portion of each of which is enclosed in a tough integument.

In order that such acceptable portions may be satisfactorily packaged and preserved, it is necessary that they be segregated from the integuments, and associated seeds. The problem of segregation is complicated by the fact that the number, angular extent and relative positions of the segments are variable in fruits of approximately the same size. In grapefruit the number of segments generally varies from 10 to 15.

The necessary segregation is now commercially accomplished by a tedious, and relatively costly, hand manipulation which, obviously must be reflected in the price at which the packaged product is offered to consumers.

The object of my present invention is to produce a mechanism by which the desired segregation may be accomplished at less cost than has heretofore been found possible.

The accompanying drawings illustrate my invention:

Fig. 1 is a perspective, somewhat diagrammatic, of mechanism embodying my invention with the spoons in intermediate positions;

Fig. 2 a similar perspective, from another viewpoint and on a slightly larger scale and with the spoons in initial position;

Fig. 3 a diagrammatic section of a grapefruit transverse to the polar diameter;

Fig. 4 a radial section through the device for segregating the meat segments;

Fig. 5 a plan of the lower end of one of the spoon rods;

Fig. 6 a side elevation of another form of segmenting spoon;

Fig. 7 a view similar to Fig. 6 with one of the springs of the spoon removed;

Fig. 8 a front elevation of the spoon showing Fig. 6;

Fig. 9 a section on line 9—9 of Fig. 6;

Fig. 10 a diagrammatic side elevation of a plurality of the spoons arranged in three independently movable circumferential groups; and Fig. 11 a fragmentary section showing the connection between the upper end of a spoon stem and its carrying collar.

In Fig. 1 of the drawings 10 indicates a turn table bearing a plurality of circumferentially-spaced forks 11, upon which the fruit is to be impaled along its polar diameter.

Fork 11 comprises an annular series of small tines 12 the upwardly-presented free end of each of which is tapered to form a small smooth rounded tip which, under ordinary working conditions will not pierce the radial portions of the segmental integuments 13 but will readily enter the meat segments within the apices of a plurality of said integuments.

These integuments comprise tough radial portions connected at their inner ends, and integral but less tough portions which bound and encase the ends and circumferential peripheries of the meat segments.

The diameter of the annulus formed by tines 12 is such that, for a graded size of fruit, the tines will penetrate the fruit just within the apices of the V's formed by the radial portions of the integuments 13 and between the polar axis of the fruit and the angular region of the seeds 14.

The turn-table may be shifted to bring each fork successively to a charging station, a seed-extraction station, and a segment-segregating station.

The fruit, having been divested of its peeling and the major portions of the circumferential parts of the integuments by a suitable peeling operation which will avoid rupture of the adhesion bond between the radial portions of the integuments, is impaled, polar-wise, upon a fork and carried thence to the deseeding station B.

At station B I provide a segmental cup 20 capable of cooperating with the fork to support the fruit against downward displacement. Arranged coaxially above the fork, at station B, is an annular series of depending tines 21, similar to tines 12 but arranged in an annulus having a diameter such that the tines will penetrate the fruit just outside the annular region of the seeds.

Tines 12 and 21 are so circumferentially spaced as to prevent the seeds from passing radially therebetween. The tines are slightly flexible and their smooth blunt ends avoid penetration of the tough radial portions of integuments 13 so that said tines adjust themselves, as they penetrate the fruit, to lie between said radial integuments.

Tines 21 are carried by a vertically reciprocable head 22 which is intermittently reciprocated by any suitable means.

Arranged coaxially above the head 22, and vertically reciprocable to and from the plane of the forks, is an ejector comprising arc-shaped groups of depending ejector pins 24 carried by a head 25. The pins are closely grouped with slight space therebetween to permit straddling of the radial integuments and their lower ends are sharply pointed so as to be capable of lightly penetrating the seeds of the fruit. The groups of ejector pins 24 are so arranged that they may be projected into the annular space between the two groups of tines 12 and 21. A sufficient number of ejector pins 24 may be provided to form a complete annulus but such an arrangement seems not to be desirable because the amount of force required to simultaneously eject all of the seeds tends to rupture the natural cohesive bond between the radial integuments.

Head 25 is to be intermittently reciprocated by any suitable mechanism and said head may be rotated (where pins 24 do not form a complete annulus) by any suitable mechanism illustrated diagrammatically by pinion 27 meshing with teeth 25' on head 25.

When tines 12 and 21 have been projected into the fruit they confine the seeds between them so that radical movement of the seeds is prevented and those portions of the meat segments beyond tines 21 are protected against radial rupturing stresses. The tines 12, lying as they do just within the apices of the integuments, hold said integuments and prevent them from being torn apart.

After the seeds have been ejected, along lines paralleling the polar axis of the fruit, pins 24 and tines 21 are withdrawn upwardly and table 10 is turned to bring the deseeded fruit into alignment with the segment freeing device.

The meat segments are segregated by a plurality of spoons or strippers, some of which are arranged in an annular primary series and the remainder of which are arranged in an annular secondary series.

Each of the spoons comprises a small rod 31 on the lower end of which are hinged two stripper wings 32, 32 yieldingly urged apart by a light spring 33. Wings 32 are free to swing, as a pair, to one side or the other of a normal neutral but this movement is limited by a pin 34 carried by rod 31 between said wings.

Each of the rods 31 of the primary spoons S' is vertically reciprocable in a vertically reciprocable head 40 and yieldingly supported by a spring 41. At its lower end each rod 31 of the primary spoons is provided with a tapered head 42, the lower end of which is tapered to a blunt point and the upper end of which is of sufficient diameter to guard the hinge mounting of the wings 32. Heads 42 have a length approximately the polar diameter of the peeled fruit. These rods 31 of the primary spoons, are somewhat loosely guided in head 40 so that the lower heads 42 of those rods may be readily deflected sidewise, for a purpose which will appear. Head 40 is carried by a vertically reciprocable plunger 44.

Each of the rods 31 of the secondary spoons S" is axially shiftable in a swingable carrier 50 hinged on a horizontal tangential axis 51 on an annular head 52 coaxial with plunger 44. Each of these rods 31, of the secondary spoons, has its upper end offset outwardly, radially of its wings 32, as indicated at 53. Each carrier 50 is provided with an arm 54 extending outwardly from its hinge mounting and the outer end of each of these arms is connected by two springs 55 and 56 with a vertically reciprocable ring 57 which is guided by perforated arms 58 sleeved over guide pins 59 arising from head 52.

Springs 55 extend upwardly from arms 54 to anchorages 60 carried by ring 57, and springs 56 extend outwardly and downwardly to anchorages 61 carried by ring 57.

An initial position of ring 57 relative to head 52 is established by any suitable mechanism whereby springs 55 will be stressed to hold the secondary spoons S" in the positions shown in Figs. 1 and 2. In the present apparatus, which is demonstrative in character rather than commercially developed, I establish this initial relationship by means of a pair of latches carried by head 52 and removably underlying two of the arms 58.

Each of the secondary spoons S" may be locked in fruit-engaging position by a spring latch 65 carried by head 52 and each of said secondary spoons is urged toward fruit-engaging position, against the action of spring 55, by a spring 66.

Vertically reciprocable on rods 70 which support head 52 is a pressure ring 71 having a circumferential series of fingers 72 adapted to engage the upper ends of some of the rods 31 of the secondary spoons S" if said spoons are in fruit-engaging position. Ring 71 also carries a circumferential series of pressure plungers 73 adapted to engage the upper ends of the remainder of the rods of the secondary spoons when they are in fruit-engaging position. Each of these plungers 73 is yieldingly urged to its lowest position relative to ring 71 by a spring 74.

Slidably mounted on plunger 44 is a collar 80 yieldingly held upwardly, in the relative position shown in Figs. 1 and 2, by springs 81 anchored on collar 82 secured to plunger 44. Depending from collar 82 are pusher rods 83 which engage collar 80. Depending from collar 80 is a circumferential series of pusher rods 84 adapted to engage the upper ends of the rods 31 of the primary spoons S'.

Hub 80, with the parts connected thereto, is reciprocated with plunger 44 and is also reciprocable independently of said plunger by means of a rod 90, guided through collar 82 at 91.

The tips 42 of the primary spoons S' are longer than the tips 42' of the secondary spoons S", for a reason which will appear, and the gap between the wings of each primary spoon is guarded by a converging pair of guard fingers 95, 95, which extend toward each other to bridge said gap so that an adjacent secondary spoon cannot become nested between the flaring wings of the primary spoon.

At the segmenting station C, I provide a segmental cup 99, similar to cup 20, to assist the fork 11 in supporting the fruit while the segmenting spoons operate thereon.

I have not attemptd to illustrate mechanism to automatically reciprocate plunger 44, heads 40, 52, hub 80, and ring 57 in proper timed relation as such mechanism may be varied through a wide range without departure from the fundamental characteristics of the mechanism which I have disclosed.

The deseeded fruit having been brought on its holding fork 11 to the segmenting station C with its polar axis substantially coaxial with the axis of the spoon groups, plungers 44 and 90 and rods 70 are simultaneously lowered to cause the long tips 42 of the spoons of group S' to penetrate the fruit until the lower ends of wings 32 enter the fruit between the radial integuments of the segments which have thus been penetrated. The blunt points of these tips permit an automatic centering of the tips between the radial integuments of the subjacent fruit segments and, as the wings of the spoons are relatively hinged, these wings are adjusted, as to the included angle, against the force of the spring 33, in accordance with the included angles of the penetrated segments. Conveniently there may be six or eight primary spoons in this group and, after entry, these spoons will be variably spaced circumferentially and the spaces between adjacent spoons will also correspond to the adjacent unpenetrated segments.

Thereupon, ring 57 is lowered, thereby releasing the tension in springs 55 and placing springs 56 under tension. The springs 56, assisting springs 66, cause the secondary spoons to swing inwardly. The guards 95 prevent entry of any secondary spoon into any adjacent primary spoon and, wherever there is sufficient space between adjacent primary spoons, a secondary spoon will be permitted to swing inwardly far enough to bring its tip 42 over the fruit and the arms 54 of the carriers of such secondary spoons will be caught and held by their latches 65. Thereupon ring 57 is raised so as to again stress springs 55 to swing back to normal outward position those secondary spoons whose arms 54 have not been caught by their latches 65. The upper ends of the rods 31 of those secondary spoons which have their arms 54 caught by their latches, are now in position to be contacted by their pushers 72 or 73.

Thereupon plunger 90 is moved downwardly to bring pushers 84 into engagement with the aligned rods 31 of the primary spoons so that the wings of those spoons will be crowded between the meat segments and adhering radial integuments so as to free said meat segments. Thereupon ring 71 is moved downwardly to bring pushers 73 into contact with aligned rods of some of the secondary spoons to shove those spoons through the fruit and then to bring pushers 72 into engagement with their aligned spoon rods 31 to push those spoons through the fruit.

The deseeding action, which I have previously described, has removed a small part of the meat at the apices of the segments so that I prefer to increase the width of the wings 32 from the tips at a fairly steep angle, as indicated at 100, and to then decrease this angle, as indicated at 101, so that the edges 101, which lie at a very flat angle to the line of stripping movement of the spoons, perform the major part of the action of separating the meat segments from their adherent radial integuments. By this arrangement breakage of the meat segments is reduced very considerably.

The offsetting of the lower ends of the rods 31 of the secondary spoons S", relative to the axis of the upper ends, as shown at 53, materially assists in permitting lateral adjustment of the secondary spoons to permit them to seat themselves properly between the primary spoons.

I have found it convenient to provide six or seven of the secondary spoons.

In view of the natural variation in number and included angles of the fruit segments, some of the segments will be missed or mangled by apparatus such as I have described but nevertheless I have found that a sufficient proportion of usable meat segments will be segregated free from their integuments to meet commercial requirements and to materially lower the cost as compared with existing methods.

Referring to Figs. 6 to 11, inclusive, the main stem or shank 110 of the spoon is provided at its lower end with a tapered tip 111 and near the lower end this shank is transversely notched at 112 to form an upwardly presented shoulder 113 and a downwardly presented shoulder 114. Sunk in each of these shoulders are two short axially extending pockets 115, the two pockets of each shoulder being slightly spaced transversely of the shank 110. Each vertically aligned pair of pockets 115 are adapted to receive pivot pins 116 formed at the upper and lower base corners of a thin stripper wing 117 having a downwardly tapered cutting edge 118.

Projecting radially from shank 110, in the neighborhood of the shoulder 114, is a finger 120 provided with a perforation 121. Secured to the upper end of each stripper wing, near its outer free edge, is a wire 122 having a vertical portion 123 rising from the stripper wing, an intermediate portion projected through perforation 121, and a deflected portion 124 lying in position to engage the face of finger 120 opposite the wing to which the wire is attached so as to limit the outward swinging movement of the stripper wing.

Finger 120 is perforated at 125 and through this perforation is threaded a U-shaped spring 126, the free ends of which engage the portions 123 of the wires 122 to normally and evenly urge the two stripper wings to their greatest degree of angular separation as limited by the respective tips 124.

Pivoted at 127 on finger 120 is a lever 128 having an arm 129, a portion of which parallels and lies slightly below the lower edge of finger 120 near its outer end, and an arm 130 to the depending end of which is secured a rod 131 which extends downwardly in the space between the base edges of the two stripper wings 117.

Pivoted at 132 on finger 120 is a cover plate 133 of a size and shape, as shown, to cover the mouth between the outer cutting edges of the two wings 117, without interfering with freedom of swinging movement of said stripper wings and the lower end of this cover plate 133 is turned outwardly, as shown in Fig. 6. A spring 135, anchored at 136 on finger 120, engages cover plate 133 to normally yieldingly urge said cover plate into close proximity to the cutting edges of the stripper wings 117. Secured to the outer face of the cover plate 133 is a projecting trip finger 140 lying below the lower edge of finger 120. This finger 140 may readily be the upper part of a rod, the lower part of which is extended downwardly along the outer face of the cover plate in order to stiffen said plate which is conveniently made of comparatively thin metal.

By providing the pivotal mountings 116 for the stripper wings, I find that freedom of swinging movement of the stripper blades is considerably facilitated as compared with the hinge mounting of the stripper wings 32 shown in Fig. 1. These stripper wings are thin flexible metal so that by a slight bowing, the upper and lower pivot pins 116 may be projected into or removed from the pockets 115 in which they are journaled.

Lever 129 is spring urged in one direction by spring 145 to normally hold the ejector finger 131 in parallelism with shank 110 and as deep as possible in the crotch between the two stripper wings, said ejector finger conveniently having a diameter not materially greater than the depth of the transverse notch 112.

In commercial use I have found it convenient to provide eleven of these segmenting spoons arranged coaxially in three groups of four, four and three, most grapefruit having as many as eleven segments and, where more than eleven segments exist, the excess number will be of comparatively small included angle.

The upper ends of the stems 110 are pivotally suspended from a vertically movable collar 150 by a pivotal connection 151 which is somewhat loose so as to permit a small universal deflection of the stem.

In the other group of four, stems 110 are similarly pivotally suspended from a collar 152, these stems passing through large perforations in collar 150. The group of three is similarly suspended from a collar 153, these stems passing through perforations in collar 152 which are large enough to permit the desired lateral deflection of the stems. The stems 110 of the entire group are passed through perforations in a fixed colar 154 arranged slightly above the uppermost positions of fingers 120, the perforations through collar 154 being large enough to permit the desired lateral displaceability of the stems 110.

The three collars 150, 152, and 153 are independently vertically movable by any suitable supporting means, not shown, collar 150 being first projected downwardly a distance slightly exceeding a fruit diameter, collar 152 being then similarly moved downwardly, and this movement being followed by a similar downward movement of the collar 153, whereupon all three collars may be simultaneously moved upwardly to initial position.

In operation, tip 111 is projected into the previously formed void extending through the juice cell segment at the apex of the unbroken integument and the stripper blades, 117, as previously described, adjust themselves into the planes of cohesion between the radial portions of the integument and the enclosed juice cell segment so as to strip the juice cell segment from the radial integuments as the tool is projected through the fruit. During this projection, cover plate 133 contacts the circumferential face of the juice cell segment, swinging outwardly as the tool descends and exerting sufficient friction upon the surface of the released segment to temporarily hold it in place between the stripper wings. After one group of spoons has been projected through the fruit, projection of the two other groups follows in succession, whereupon all of the groups are raised, carrying the released fruit juice cell segments with them until suitable tripping mechanism (not shown) engages fingers 140 and lever arms 129 to swing the cover plates 133 and the ejector fingers 131 outwardly, the outward swing of the cover plates being slightly greater than the outward swing of the ejector fingers and thereby releasing the juice cell segments.

I claim as my invention:

1. Apparatus for segregating natural fruit segments from their integuments, comprising a primary and a secondary annular group of spoons grouped about a common axis, means for supporting a fruit with its polar axis in substantial alignment with the axis of said groups, supporting means for the secondary spoons radially of the group axis, an actuator connected with said secondary spoons to move the same toward the group axis between adjacent spoons of the primary axis, and to retract said secondary spoons from the group axis, and latching means positioned to engage and restrain the secondary spoons in interdigitated relation with the primary spoons.

2. Apparatus of the character defined in claim 1, wherein the spoons comprise two divergent wings relatively angularly yieldingly adjustable to vary the included angle therebetween.

3. Apparatus of the character specified in claim 1, wherein the primary and secondary spoons are independently movable along the common axis.

4. Apparatus of the character specified in claim 1, wherein the spoons are independently movable parallel with the group axis, together with actuating means for said spoons comprising independently yielding plungers.

5. Apparatus of the character specified in claim 1, wherein the support for a secondary spoon comprises a swinging carrier in which the spoon is slidably mounted, an actuator for swinging said carriers, and a pair of oppositely acting resilient connections between said actuator and each of said carriers.

6. Means for segregating natural fruit segments from their integuments, comprising a main rod having a fruit-penetrating tip pointed at its free end and of greater diameter than the rod at its junction therewith, and a pair of opposed tapered stripper wings hinged upon said rod with their narrow ends guarded by said tip.

7. Means for segregating natural fruit segments from their integuments, comprising a main rod having a fruit-penetrating tip pointed at its free end and of greater diameter than the rod at its junction therewith, and a pair of opposed tapered stripper wings hinged upon said rod with their narrow ends guarded by said tip, and the end of said rod beyond the wings laterally offset relative to the wing-bearing portion of the rod.

8. Means for segregating natural fruit segments from their integuments, comprising a carrier capable of insertion polarwise into the apex of a fruit segment between the flaring portions of the integument of such segment, two divergent stripper blades independently hinged on said carrier for independent movement for variable divergences, each of said stripper blades having its free outer edge inclined to the hinge axis, and spring means for yieldingly diverging said blades.

9. Means for segregating natural fruit segments from their integuments, comprising a pair of divergent, fruit penetrating, stripping wings, independently hinged for variable divergence and each carrying, at its free edge, at a point intermediate its length, a laterally projecting finger projecting toward the companion wing to obstruct radial entry between said wings.

10. Means for segregating natural fruit segments from their integuments, comprising a pair of divergent, fruit penetrating, stripping wings, independently hinged for variable divergence and one of said wings carrying, at its free edge, at a point intermediate its length, a laterally projecting finger extending from the edge of said wing toward the adjacent wing and partaking of all of the movements of the carrying wing to obstruct radial entry between said wings.

11. Means for segregating natural fruit segments from their integuments, comprising a carrier capable of insertion polarwise into the apex of a fruit segment between the flaring portions of the integument of such segment, two divergent stripper blades independently hinged on said carrier for independent movement for variable diversions, each of said stripper blades having its free outer edge inclined to the hinge axis, spring means for yieldingly diverging said blades, and a movable cover plate adjacent the outer free edges of the stripper blades in position to engage the circumferential surface of a juice cell segment.

12. Means for segregating natural fruit segments from their integuments, comprising a carrier capable of insertion polarwise into the apex of a fruit segment between the flaring portions of the integument of such segment, two divergent stripper blades independently hinged on said carrier for independent movement for variable diversions, each of said stripper blades having its free outer edge inclined to the hinge axis, spring means for yieldingly diverging said blades, a movable cover plate adjacent the outer free edges of the stripper blades in position to engage the circumferential surface of a juice cell segment, and a spring normally urging said cover plate toward the stripper blades.

13. Means for segregating natural fruit segments from their integuments, comprising a carrier capable of insertion polarwise into the apex of a fruit segment between the flaring portions of the integument of such segment, two divergent stripper blades independently hinged on said carrier for independent movement for variable diversions, each of said stripper blades having its free outer edge inclined to the hinge axis, spring means for yieldingly diverging said blades, and an ejector finger arranged substantially parallel with the carrier in the crotch between the two stripper blades and means by which said ejector finger may be swung outwardly.

14. Means for segregating natural fruit segments from their integuments, comprising a carrier capable of insertion polarwise into the apex of a fruit segment between the flaring portions of the integument of such segment, two divergent stripper blades independently hinged on said carrier for independent movement for variable diversions, each of said stripper blades having its free outer edge inclined to the hinge axis, spring means for yieldingly diverging said blades, a movable cover plate adjacent the outer free edges of the stripper blades in position to engage the circumferential surface of a juice cell segment, and an ejector finger arranged substantially parallel with the carrier in the crotch between the two stripper blades and means by which said ejector finger may be swung outwardly.

15. Means for segregating natural fruit segments from their integuments, comprising a carrier capable of insertion polarwise into the apex of a fruit segment between the flaring portions of the integument of such segment, two divergent stripper blades independently hinged on said carrier for independent movement for variable diversions, each of said stripper blades having its free outer edge inclined to the hinge axis, spring means for yieldingly diverging said blades, a movable cover plate adjacent the outer free edges of the stripper blades in position to engage the circumferential surface of a juice cell segment, a spring normally urging said cover plate toward the stripper blades, an ejector finger arranged substantially parallel with the carrier in the crotch between the two stripper blades and means by which said ejector finger may be swung outwardly.

16. Means for segregating natural fruit segments from their integuments, comprising a carrier capable of insertion polarwise into the apex of a fruit segment between the flaring portions of the integument of such segment, two divergent stripper blades each independently hinged on said carrier by means of upper and lower axially extending pivot pins for independent movement for variable divergence, each of said stripper blades having its free outer edge inclined to the hinge axis, and spring means for yieldingly diverging said blades.

17. Means for segregating natural fruit segments from their integuments, comprising a rod-like carrier capable of insertion polarwise into the apex of a fruit segment between the flaring portions of the integument of such segment, said carrier being transversely notched near its lower end to provide an upwardly presented shoulder and a downwardly presented shoulder, two axially extending laterally spaced pockets formed in each of said shoulders, two divergent stripper blades each provided at its upper and lower base corners with pivot pins adapted to be seated in said pockets, and spring means for yieldingly diverging said blades.

18. Means for segregating natural fruit segments from their integuments, comprising a rod-like carrier capable of insertion polarwise into the apex of the fruit segment between the flaring portions of the integument of such segment, and two divergent stripper blades independently hinged on said carrier upon closely adjacent but laterally spaced pivot axes substantially parallel with the axes of said carrier, spring means for yieldingly swinging said blades apart, and means for independently limiting the outward movement of said blades.

19. An implement for rupturing the natural bond between a radial segment-integument and the substantially-whole adherent juice-cell-group, in a substantially-whole peeled fruit of the citrus type, comprising a slender rod the diameter of which is small enough to permit projection thereof polarwise of and through a fruit segment within the apex of the segment-integument between the radial portions of said integument without rupture of the apex of the integument, a pair of divergent stripper blades independently pivoted on said rod so as to lie in divergent planes substantially tangent to said rod and having free edges which are tapered lengthwise of the rod, and means for yieldingly diverging said blades.

RALPH POLK, Jr.